(12) United States Patent
Pope et al.

(10) Patent No.: US 9,425,687 B2
(45) Date of Patent: Aug. 23, 2016

(54) METHODS OF OPERATING SWITCHED MODE POWER SUPPLY CIRCUITS USING ADAPTIVE FILTERING AND RELATED CONTROLLER CIRCUITS

(71) Applicant: Cree, Inc., Durham, NC (US)

(72) Inventors: Daniel Pope, Morrisville, NC (US); Yuequan Hu, Morrisville, NC (US)

(73) Assignee: Cree, Inc., Durham, NC (US)

( * ) Notice: Subject to any disclaimer, the term of this patent is extended or adjusted under 35 U.S.C. 154(b) by 326 days.

(21) Appl. No.: 13/945,255

(22) Filed: Jul. 18, 2013

(65) Prior Publication Data

US 2014/0252965 A1  Sep. 11, 2014

Related U.S. Application Data

(63) Continuation-in-part of application No. 13/792,457, filed on Mar. 11, 2013.

(51) Int. Cl.
*H02M 3/04* (2006.01)
*H05B 33/08* (2006.01)

(52) U.S. Cl.
CPC .............. *H02M 3/04* (2013.01); *H05B 33/0818* (2013.01); *H05B 33/0827* (2013.01); *Y02B 20/346* (2013.01)

(58) Field of Classification Search
CPC ........................... H02M 1/4225; H05B 33/086
USPC ............ 315/297; 323/234, 283, 244; 713/340
See application file for complete search history.

(56) References Cited

U.S. PATENT DOCUMENTS

| | | | |
|---|---|---|---|
| 5,903,138 A * | 5/1999 | Hwang | H02M 1/4225 323/224 |
| 6,272,025 B1 | 8/2001 | Riggio et al. | |
| 7,420,335 B2 | 9/2008 | Robinson et al. | |
| 7,759,881 B1 | 7/2010 | Melanson | |
| 8,471,488 B1 | 6/2013 | Hopkins et al. | |
| 8,669,721 B2 | 3/2014 | Wantnabe et al. | |
| 8,912,778 B1 | 12/2014 | Bennett et al. | |
| 2005/0218838 A1 | 10/2005 | Lys | |
| 2006/0172783 A1* | 8/2006 | Leung | H02M 3/33515 455/572 |
| 2007/0188114 A1 | 8/2007 | Lys et al. | |
| 2008/0018261 A1 | 1/2008 | Kastner | |
| 2008/0024104 A1 | 1/2008 | Yamada | |
| 2009/0102445 A1 | 4/2009 | Ito et al. | |
| 2009/0219003 A1 | 9/2009 | Yang | |
| 2009/0327786 A1* | 12/2009 | Carroll | G06F 1/26 713/340 |
| 2010/0026208 A1 | 2/2010 | Shteynberg et al. | |
| 2010/0033150 A1 | 2/2010 | Irissou et al. | |
| 2010/0164403 A1* | 7/2010 | Liu | H05B 33/086 315/297 |

(Continued)

OTHER PUBLICATIONS

Title: Energy Star * Version 5.0 Date: Feb. 2009 Published by Inter with technical collaboration from U.S Environmental Protection Agency.*

*Primary Examiner* — Thai Pham
*Assistant Examiner* — Wei Chan
(74) *Attorney, Agent, or Firm* — Myers Bigel & Sibley, P.A.

(57) ABSTRACT

A method of operating a switched mode power supply circuit can be provided by determining an error in a control signal for the switched mode power supply circuit. The error can be compared to an error threshold value to provide a filtering selection. The error can be adaptively filtered of based on the filtering selection to provide a selected filtering and the error can be filtered using the selected filtering.

27 Claims, 7 Drawing Sheets

(56) References Cited

U.S. PATENT DOCUMENTS

| | | |
|---|---|---|
| 2010/0165669 A1 | 7/2010 | Li |
| 2010/0308733 A1 | 12/2010 | Shao |
| 2011/0006691 A1 | 1/2011 | Blaha et al. |
| 2011/0037414 A1* | 2/2011 | Wang ................ H05B 33/0815 315/297 |
| 2011/0050185 A1 | 3/2011 | Notman et al. |
| 2011/0133662 A1 | 6/2011 | Yan et al. |
| 2011/0188270 A1 | 8/2011 | Schmid et al. |
| 2011/0248640 A1 | 10/2011 | Welten |
| 2011/0248648 A1 | 10/2011 | Liu |
| 2012/0049824 A1 | 3/2012 | Chen et al. |
| 2012/0081018 A1 | 4/2012 | Shteynberg et al. |
| 2012/0139423 A1 | 6/2012 | Angelin et al. |
| 2012/0139433 A1 | 6/2012 | Yan et al. |
| 2012/0153866 A1 | 6/2012 | Liu |
| 2012/0242247 A1 | 9/2012 | Hartmann et al. |
| 2012/0262079 A1 | 10/2012 | Lin et al. |
| 2012/0268023 A1 | 10/2012 | Yan et al. |
| 2012/0306459 A1 | 12/2012 | Ho et al. |
| 2013/0082675 A1* | 4/2013 | Capodivacca ........... G05F 1/468 323/283 |
| 2013/0113375 A1 | 5/2013 | Leung et al. |
| 2013/0119951 A1* | 5/2013 | Sreenivas .............. H02M 3/157 323/234 |
| 2013/0169172 A1 | 7/2013 | Kesterson et al. |
| 2014/0132236 A1 | 5/2014 | Darmawaskita et al. |
| 2014/0167637 A1 | 6/2014 | Lin et al. |
| 2014/0184187 A1 | 7/2014 | Hwang et al. |
| 2014/0253079 A1 | 9/2014 | Ding et al. |

* cited by examiner

METHODS OF OPERATING SWITCHED MODE POWER SUPPLY CIRCUITS USING ADAPTIVE FILTERING AND RELATED CONTROLLER CIRCUITS

CROSS-REFERENCE TO RELATED APPLICATION

The present application is related to commonly assigned U.S. patent application Ser. No. 13/792,457 filed on Mar. 11, 2013, entitled POWER SUPPLY WITH ADAPTIVE-CONTROLLED OUTPUT VOLTAGE, the entire disclosure of which is hereby incorporated herein by reference.

BACKGROUND

The present disclosure generally relates to switched mode power supply circuits, and more particularly, to switched mode power supply circuits for solid state lighting.

As a result of continuous technological advances that have brought about performance improvements, light-emitting diodes (LEDs) are increasingly finding use in applications such as traffic lights, automobiles, general-purpose lighting, and liquid-crystal-display (LCD) backlighting. As solid state light sources, LED lighting is poised to replace existing lighting sources, such as incandescent and fluorescent lamps, in the future since LEDs do not contain mercury, exhibit fast turn-on and dimmability, have long life-times, and can be low maintenance. Compared to fluorescent lamps, LEDs can be more easily dimmed either by linear dimming or pulse-width modulated (PWM) dimming.

A light-emitting diode (LED) is a semiconductor device that emits light when its p-n junction is forward biased. While the color of the emitted light primarily depends on the composition of the material used, its brightness is directly related to the current flowing through the p-n junction. Therefore, a driver circuit providing a constant current may be used with LEDs.

FIG. 1 shows a lighting apparatus including a number of LED strings 1 to n driven by respective constant currents provided by current regulators 1 to N. Each of the current regulator receives an input voltage VIN and provides the (same or different) current to respective LED strings, each of which includes at least one LED. LED strings 1 to N may generate lights of the same color or different color depending on the color output requirements of the lighting apparatus.

A current regulator may be a linear current regulator, such as the regulators 16-1 to 16-n shown in FIG. 2 or a switching current regulator, such as the regulators 18-1 to 18-n shown in FIG. 3. A linear current regulator generally has lower cost than a switching regulator. However a linear current regulator may have lower efficiency than a switching regulator depending on the voltage drop across the regulator.

In FIGS. 2 and 3, a power source 12, which may be DC or AC, provides an input voltage for a switching pre-regulator 14, which regulates an output voltage VB. Each of the current regulators 16-1 to 16-n, 18-1 to 180-n, receives the voltage VB and regulates the driving current through a respective LED string coupled thereto. The power source 12 can be, for example, a battery or an ac source from the utility power line. The switching pre-regulator 14 can be any type of dc/dc or ac/dc converter, and can be isolated or non-isolated depending on the application.

SUMMARY

Embodiments according to the invention can provide methods of operating switched mode power supply circuits using adaptive filtering and related controller circuits. Pursuant to such embodiments, a method of operating a switched mode power supply circuit can be provided by determining an error in a control signal for the switched mode power supply circuit. The error can be compared to an error threshold value to provide a filtering selection. The error can be adaptively filtered of based on the filtering selection to provide a selected filtering and the error can be filtered using the selected filtering.

In some embodiments according to the invention, a power supply circuit can include a voltage regulator that can be configured to receive an input voltage and to generate an output voltage responsive thereto. A switching current regulator circuit can be coupled to the output voltage of the voltage regulator and can be configured to regulate a level of current supplied to a load, wherein the switching current regulator circuit can be controlled by a switching signal having a duty cycle. An overhead controller can be configured to compare a duty cycle error of the duty cycle to a duty cycle error threshold value to adapt filtering used to filter feedback of the duty cycle error to the voltage regulator.

In some embodiments according to the invention, a power supply circuit can include a voltage regulator that can be configured to receive an input voltage and to generate an output voltage. A switching current regulator circuit can be coupled to the output voltage of the voltage regulator and can be configured to regulate a level of current supplied to a load, wherein the switching current regulator circuit can be controlled by a switching signal having a duty cycle. A controller circuit can be configured to compare a voltage regulator error in a voltage regulator output to a voltage regulator error threshold value to adapt filtering used to filter the voltage regulator error used to control the voltage regulator output.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS ACCORDING TO THE INVENTION

Figure 1:
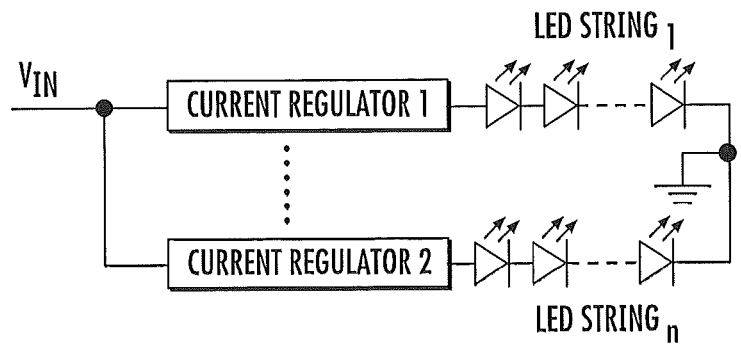
FIG. 1 is a schematic block diagram of a solid state lighting apparatus including multiple LED strings.
Figure 2:
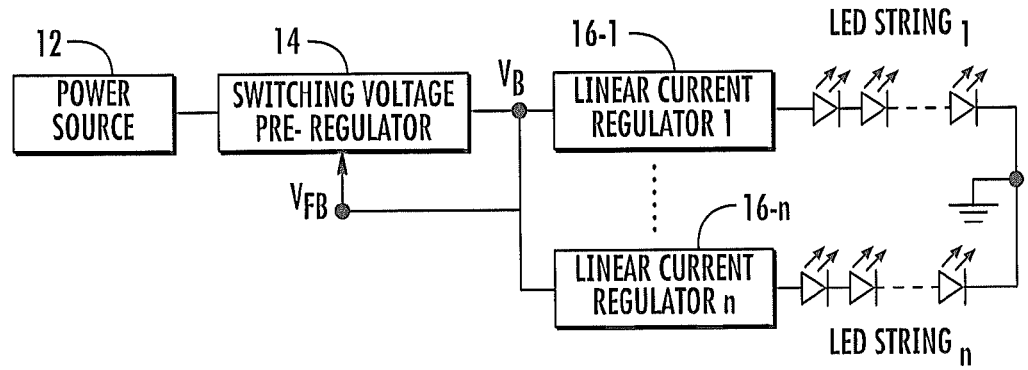
FIG. 2 is a schematic block diagram of a solid state lighting apparatus including multiple LED strings, a pre-regulator and linear current regulators for each of the LED strings.
Figure 3:
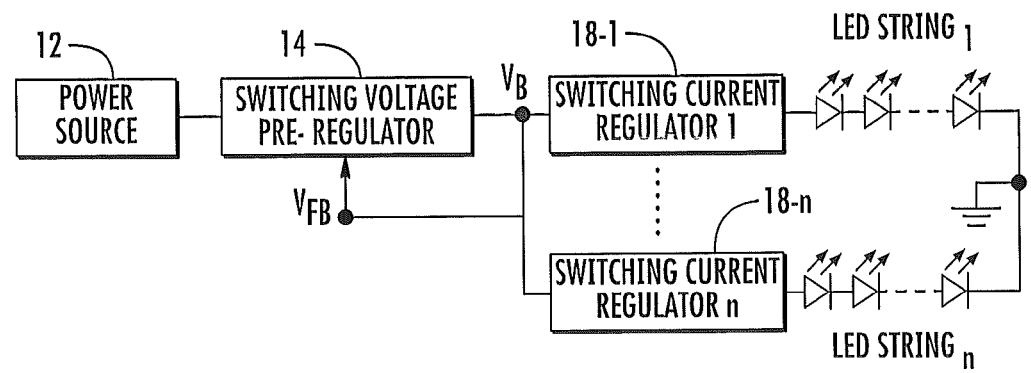
FIG. 3 is a schematic block diagram of a solid state lighting apparatus including multiple LED strings, a pre-regulator and switching current regulators for each of the LED strings.

Embodiments of the present inventive concepts are described herein with reference to the accompanying drawings. The inventive concepts may, however, be embodied in many different forms and should not be construed as limited to the embodiments set forth herein. Rather, these embodiments are provided so that this disclosure will be thorough and complete, and will fully convey the scope of the inventive concepts to those skilled in the art. Like numbers refer to like elements throughout.

As described herein, in some embodiments according to the invention, a lighting apparatus can include a controller circuit that is operatively coupled to current regulator circuits driving respective strings of LEDs using a control signal that can be subjected to different filtering based on whether an error value for the control signal is more or less than a threshold value for the error. The selection of the filtering can be provided by comparing the error in the control signal to a threshold value for the error. For example, if the error is less than the threshold value, then relatively low bandwidth linear filtering may be used to provide sufficient power factor correction (PFC). If, however, the error in the control signal is greater than the threshold value for the error, relatively high bandwidth, linear or nonlinear, filtering may be used to restore regulation of the string more quickly.

As appreciated by the present inventors, using relatively low bandwidth linear filtering on the control signal may provide for better power factor correction, whereas relatively high bandwidth (linear or nonlinear) filtering may trade off some power factor correction in favor of more immediate regulation of the voltage provided to the current regulator circuit when, for example, transients occur in the load or in the power source. For example, in some embodiments according to the invention, when the LEDs in the strings switch on/off, the voltage provided to the string may vary such that regulation may be lost unless otherwise quickly addressed. Accordingly, higher bandwidth filtering may be used to enable more feedback of the control signal to more quickly restore regulation when transients occur. It will be understood that using a linear or nonlinear high bandwidth filter may allow faster feedback of the control signal when transients occur by allowing high frequency components included in the control signal to be fed-back, whereas lower bandwidth linear filtering may cause the high frequency components in the control signal to be suppressed so that operation of the current regulator circuit may suffer a loss of regulation by reacting more slowly.

Comparing the error in the control signal to the threshold value can indicate the present operational environment, which in-turn, can provide the basis for adapting the filtering. For example, when a relatively small error (less than the threshold value) is determined to be included in the control signal, relatively low bandwidth linear filtering may be adequate such that good power factor correction is maintained. In contrast, if the error in the control signal is determined to be relatively large (greater than the threshold value) changing to higher bandwidth filtering can help restore regulation more quickly. Moreover, once regulation is restored, the error in the control signal may return to less than the threshold value such that the filtering may again be changed to again configure the apparatus for good power factor correction.

It will be further understood that the different filtering (or types of filters) can be provided by programmed operation of the controller circuit. For example, in some environments according to the invention, different filtering may be implemented in software by the controller circuit whereupon the selected filtering can be applied by the controller circuit. In some embodiments according to the invention, the different digital filtering may be implemented in software by adjusting at least one parameter associated with a general digital filter. In some embodiments according to the invention, the filtering can be implemented as infinite impulse response filtering (in software) where the least one parameter associated with the general digital filter can be adapted to provide the selected filtering.

The filtering may be adapted by modifying the at least one parameter associated with the general digital filter. For example, in some embodiments according to the present invention, the controller circuit can select low bandwidth linear filtering by providing the general digital filter with a first gain setting for operation. In contrast, the controller circuit can select higher bandwidth nonlinear filtering by providing the general digital filter with a second gain setting that changes the filtering from linear operation to non-linear operation. In still further embodiments according to the present invention, the controller circuit can select high bandwidth nonlinear filtering by setting the control signal to a particular value that is configured to re-establish voltage level to the LED string or duty cycle to within acceptable limits. In such embodiments, the controller circuit may, for example, force the control signal (error) to the particular value by writing a register value associated with the control signal.

It will be understood that the controller circuit can be any microcontroller, microprocessor, or other general purpose or specialized processor circuit that includes the appurtenant circuitry for the provisioning of functions such as those described herein, for example, circuits configured to operate as a voltage regulator.

Figure 4:
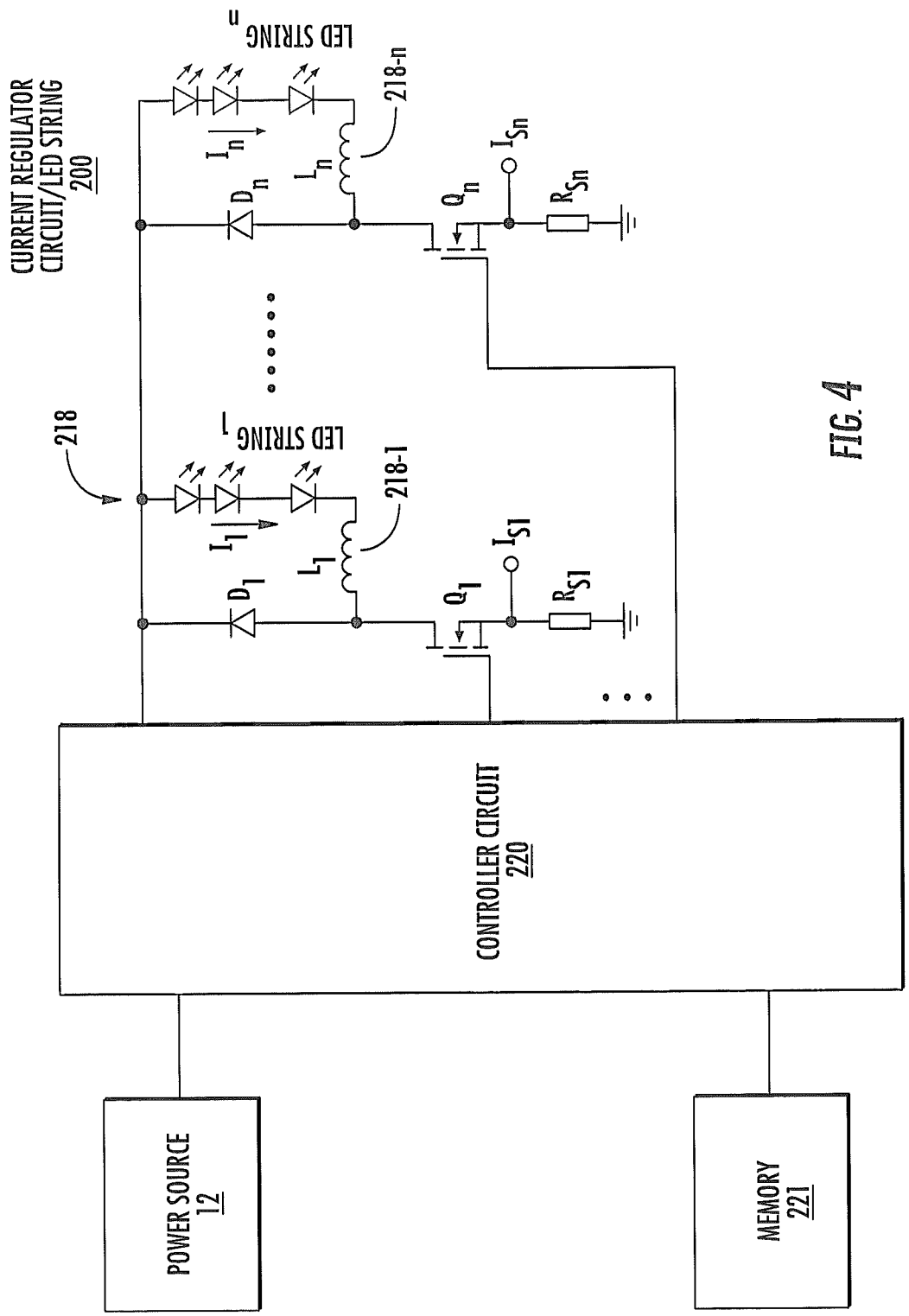
FIG. 4 is a schematic block diagram illustrating a lighting apparatus in some embodiments according to the invention.

FIG. 4 is a schematic block diagram illustrating a lighting apparatus 200 in some embodiments according to the invention. The lighting apparatus 200 includes a power source 12 (which may be dc or ac), a controller circuit 220 and buck converters 218-1 to 218-n coupled to respective strings of LEDs. Each of the buck converters 218-1 to 218-n includes an inductor Ln, a diode Dn, a switch Qn, and a current sensing resistor Rsn. The buck converters 218-1 to 218-n can be referred to as current regulator circuits. As shown in FIG. 4, the controller circuit 220 can be coupled to a memory 221 that is configured to store programmed instructions which, when executed, can perform the operations of the controller circuit 220. In some embodiments according to the invention, the memory 221 is included in the controller circuit 220.

The power source 12 can provide power from the utility power line, or any other type of power source. The controller circuit 220 can include functionality that provides a voltage pre-regulator function (that operates, for example as a boost converter), a buck converter function, a flyback converter function, or any other type of power converter function and an overhead controller function to manage efficient operation of the lighting apparatus 200.

The LED strings 1 to n may have the same or different numbers and colors of LEDs in series, parallel, or series/parallel arrangements. It will be further understood that in some embodiments according to the present invention any combination of the functions described above can be provided as digital or analog circuits outside the controller circuit 220, which can be operatively coupled to the controller circuit 220. It will be further understood that the controller circuit 220 and the current regulator circuits can function collectively as a switched mode power supply circuit in some embodiments according to the invention.

The controller circuit 220 can be configured to regulate the current through each of the LED strings by sensing each of the currents i1 to in provided to the LED strings and controlling the operation (i.e., on/off) of the switches Q1 to Qn for a given input voltage VB. The controller circuit 220 can operate the switches Q1 to Qn via the respective switching signals provided to each of the buck converters 218-1 to 218-n. Accordingly, each of the switching signals can be driven to operate the each of the buck converters 218-1 to 218-n at a respective duty cycle. The controller circuit 220 may also detect faults, such as over temperature, short-circuit, open-circuit, etc., and provide protection of the lighting apparatus 200 in the event of any such fault.

The controller circuit 220 can also be configured to adjust the output voltage VB of the voltage regulator function by feeding back a control signal (sometimes referred to as VCTL) to the input of the voltage regulator function (via the overhead controller function) so that the maximum value of the duty cycle of the buck converters 218-1 to 218-n is maintained, for example, at about 90% despite variations in the power provided by the power source 12 as well as variations in the loads provided by the LEDs (when for example, ones of the LEDs turn on/off). In this way, the efficiencies of the buck converters 218-1 to 218-n, and the overall efficiency of the lighting apparatus 200 may be managed by the controller circuit 220.

In operation, an overhead controller in the controller circuit 220 monitors the duty cycle of each of the switching signals provided to the transistors Q1 to Qn of the buck converters 218-1 to 218-n. In some embodiments according to the invention, the overhead controller is programmed to maintain the duty cycles of the switching signals at or above a particular target value in order to maintain efficient operation of the lighting apparatus as variations in the load provided by the LEDs and/or variation in the power source occur.

In some embodiments according to the present invention, the target value for the duty cycle can be about 80 percent. In some embodiments according to the present invention, the target value for the duty cycle can be about 85 percent. In some embodiments according to the present invention, the target value for the duty cycle can be about 90 percent. In some embodiments according to the present invention, the target value for the duty cycle can be about 95 percent. In some embodiments according to the present invention, the target value for the duty cycle can be about 99 percent.

To maintain the duty cycle at the target value, the overhead controller can provide feedback of an error in the duty cycle, as the control signal, to the voltage regulator (in the form of the voltage regulator command VCTL) to increase or decrease the output of the voltage regulator function. The increase or decrease in the duty cycle can represent the duty cycle error as being the amount that the duty cycle should be changed to maintain target value of the duty cycle. The feedback of the duty cycle to the voltage regulator is provided through selected filtering in the overhead controller so that changes in the voltage regulator command (represented as the error in the duty cycle) are controlled in accordance with the particular environment in which the apparatus is currently operating.

The overhead controller can determine the duty cycle error by comparing the present value of the duty cycle to the target value for the duty cycle. The error can then be compared to a threshold value for the duty cycle error to select the filtering on the duty cycle error feedback to the voltage regulator, which in-turn can help maintain the duty cycle at the target value. For example, if the error in the duty cycle is less than the threshold value for the duty cycle error, the overhead controller can adapt the filter to select relatively low bandwidth linear filtering for the voltage regulator command VCTL thereby maintaining regulation with sufficient power factor correction.

If, however, the duty cycle error is greater than the threshold value for the duty cycle error, the overhead controller can change the filtering from low bandwidth linear filtering to higher bandwidth linear or non-linear filtering to provide more bandwidth for changing the voltage regulator command VCTL so that voltage regulation may be more quickly restored. In other words, a duty cycle error that is predetermined to indicate a loss of regulation of the voltage provided to the LED string may be addressed by allowing the overhead controller to change the voltage regulator output more quickly than would be allowed if lower bandwidth filtering were used. Accordingly, the filtering can be changed to higher bandwidth filtering under appropriate conditions.

It will be understood that the duty cycle signal filtered by the controller circuit can be the peak duty cycle of all of the duty cycle signals provided to the plurality of LED strings. For example, in some embodiments according to the invention, the controller circuit can compare all of the duty cycle signals associated with the LED strings, and filtering the peak duty cycle based on applying the threshold to the highest duty cycle signal that has the highest duty cycle.

Still referring to FIG. 4, the voltage regulator can also be controlled to adaptively filter the control signal to the voltage regulator based on comparing the error in the output of the voltage regulator to a threshold value for the voltage regulator error. Accordingly, in some embodiments according to the invention, the control signal to the voltage regulator can be adaptively filtered. For example, in some embodiments according to the invention, the threshold value for the voltage regulator error may be set to about 5 volts such that if the controller circuit determines that the error in the voltage regulator output is less than 5 volts, low bandwidth linear filtering can be applied to the control input (voltage regulator error) to the voltage regulator. If, however, the controller circuit determines that the voltage regulator error is greater than 5 volts, higher bandwidth non-linear filtering can be applied to the control input to the voltage regulator.

In this way, the output of the voltage regulator may be changed more quickly to restore voltage regulation by the use of non-linear filtering so that high frequency components included in the voltage regulator error are allowed to affect the voltage regulator output with higher bandwidth filtering. In contrast, lower bandwidth linear filtering may be applied to the error under conditions where voltage regulation is being maintained with some relatively low frequency variation in the voltage regulator control input. It will be further understood that the selected filtering associated with the voltage regulator error can be provided in the same ways as with the duty cycle error filtering. Still further, in some embodiments according to the invention, the controller circuit can select filtering for the duty cycle error and/or the voltage regulator error.

Figure 5:
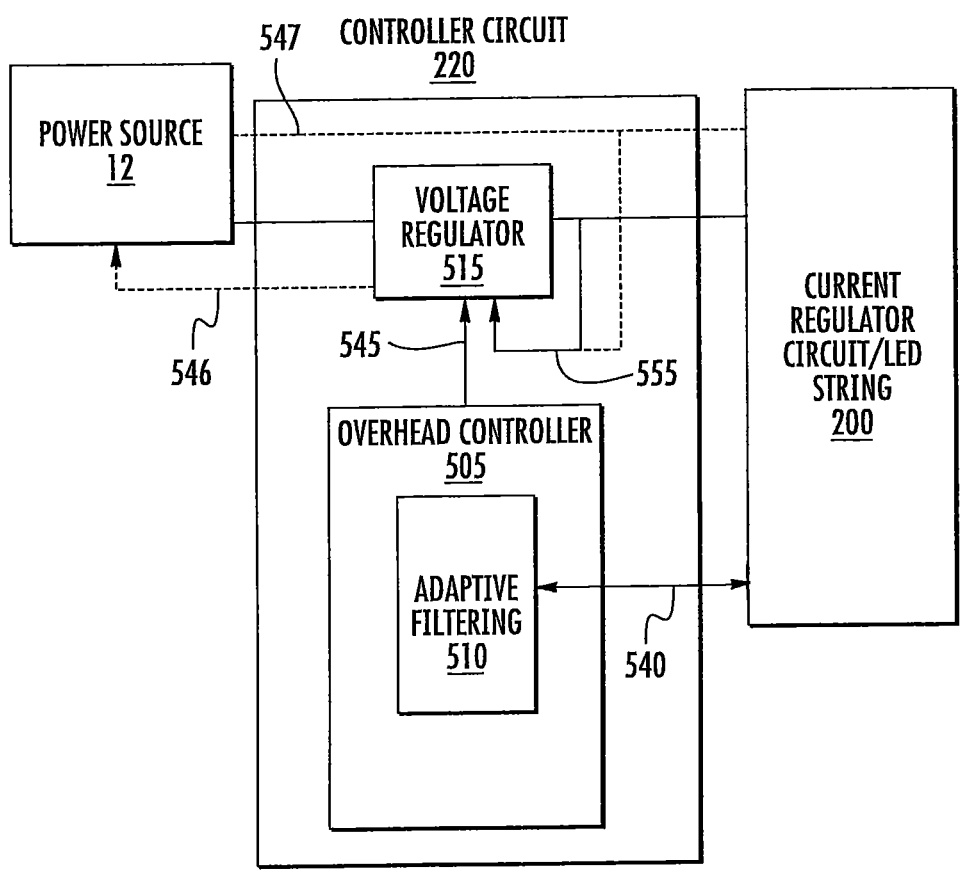
FIG. 5 is a schematic block diagram illustrating a controller circuit including an overhead controller with adaptive duty cycle error filtering in some embodiments according to the invention.

FIG. 5 is a schematic block diagram illustrating the controller circuit 220 including an overhead controller 505 with adaptive filtering of the duty cycle error in some embodiments according to the invention. According to FIG. 5, the controller circuit 220 includes a voltage regulator 515 that provides a voltage regulator output 555 to the current regulator circuit/LED string 200 as described above in reference to FIG. 4. The controller circuit 220 also provides a switching signal 540 to the current regulator circuit/LED strings 200 to operate the switches Qn in the buck converters 218-1 to 218-n.

An overhead controller 505 included in the controller circuit 220 can determine the duty cycle of the switching signals 540 for use in adapting the filtering of the duty cycle error to the voltage regulator 515. In particular, an adaptive filtering 510 can be used to adapt the filtering for the feedback in the form of voltage regulator commands VCTL 545. These commands VCTL 545 are utilized by the voltage regulator 515 to control the voltage regulator output 555 provided to the current regulator circuit/LED string 200. As described herein, the adaptive filtering 510 included in the overhead controller 505 can use the duty cycle error to apply, for example, relatively low bandwidth linear and higher bandwidth nonlinear filtering of the peak duty cycle error as feedback in the form of the regulator commands VCTL 545.

In some embodiments according to the present invention, the voltage regulator 515 can provide a control signal 546 to the power source 12 based on the commands VCTL 545 and the feedback of the voltage regulator output 555. Accordingly, a control signal 546 can control the output of the power source 12 to provide power 547 to be string 200 as illustrated by the dashed lines shown in FIG. 5. It will be further understood that this type of control provided to the power source 12 can be implemented in any of the embodiments illustrated herein.

Figure 6:
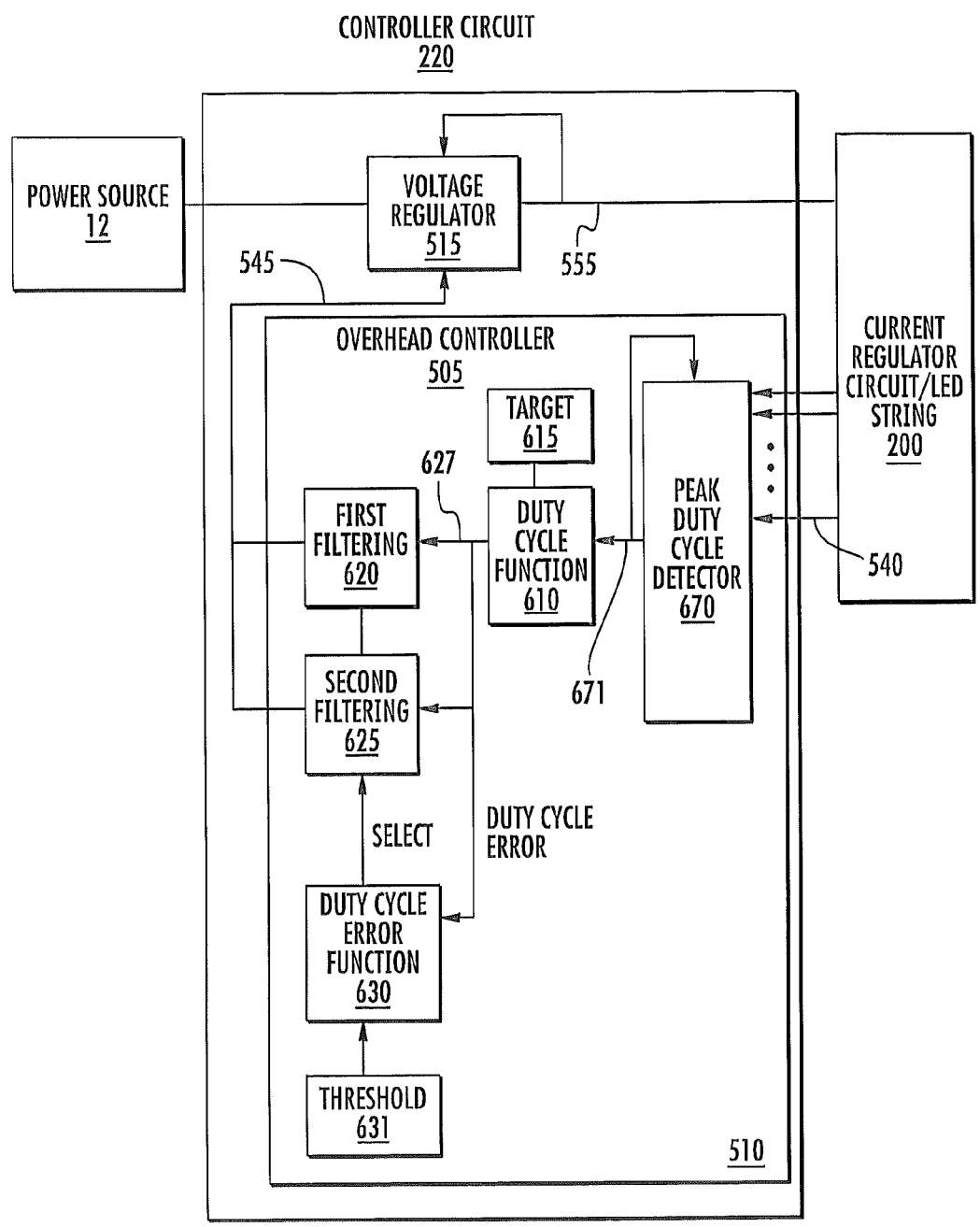
FIG. 6 is a schematic block diagram illustrating the overhead controller of FIG. 5 with adaptive duty cycle error filtering in greater detail in some embodiments according to the invention.

FIG. 6 is a schematic block diagram illustrating the overhead controller 505 of FIG. 5 with adaptive duty cycle error filtering in greater detail in some embodiments according to the invention. As shown in FIG. 6, the duty cycle signals 540 associated with each of the strings of LEDs are provided to a peak duty cycle detector 670. The peak duty cycle detector 670 is configured to determine which of the duty cycle signals 540 has the highest frequency to provide a selected duty cycle signal 671. Accordingly, the selected duty cycle signal 671 is utilized for the determination of the duty cycle error so that the corresponding string of LEDs will be regulated.

It will be understood that the selected duty cycle signal output 671 is also utilized as feedback to the peak duty cycle detector 670. The feedback can be used to adaptively filter the selected duty cycle signal 671. For example, in some embodiments according to the invention, if the output 671 is greater than all of the inputs to the of the peak duty cycle detector 670, then the selected input can be subjected to low bandwidth linear filtering. If, however, the value of the selected duty cycle signal 671 is less than at least 1 of the inputs to the peak duty cycle detector 670, then higher bandwidth linear or non-linear filtering may be applied to the selected input by the peak duty cycle detector 670. In some embodiments, if the value of the selected duty cycle signal 671 is less than at least 1 of the inputs to the peak duty cycle detector 670, then the output 617 can be directly made equal to the at least 1 input.

As shown in FIG. 6, the selected duty cycle 671 is provided to a duty cycle error function 610 that is configured to determine the error in the selected duty cycle 671 by comparing the selected duty cycle signal 671 from the strings to a duty cycle target value 615 that is accessible to the duty cycle error function 610.

The duty cycle error function 610 can use the comparison with the target value 615 to provide the duty cycle error as feedback to the voltage regulator 515 to achieve the target duty cycle. For example, if the target duty cycle 615 specifies that the target duty cycle for the current regulator circuit/LED string 200 is 90%, and the duty cycle error function 610 determines that the actual duty cycle of the selected duty cycle signal 671 only 80%, the duty cycle error function 610 can provide the duty cycle error 627 to close the gap between the actual duty cycle and the target duty cycle. In some embodiments according to the invention, duty cycle error 627 can indicate a percentage difference between the actual duty cycle and the target value 615. It will be understood, however, that other representations of the duty cycle error 627 may be used.

The duty cycle error 627 is also provided to the duty cycle error function 630. The duty cycle error function 630 is configured to access a duty cycle error threshold value 631 that can be used to adapt the filtering to be more effective in maintaining (or attaining) the target duty cycle and/or sufficient power factor correction. For example, if the duty cycle error function 630 determines that the duty cycle error 627 is less than the duty cycle error threshold value 631, first filtering 620 may be applied on the duty cycle error 627 as the voltage regulator commands VCTL 545, so that proper power factor correction can be maintained. If, however, the duty cycle error function 630 determines that the duty cycle error 627 exceeds the duty cycle error threshold value 631, the filtering can be changed to provide second filtering 625 to the duty cycle error 627, which may allow the voltage regulator 515 to more quickly restore regulation at the regulator output 555. Accordingly, the duty cycle error function 630 can adapt the filtering for the feedback to the voltage regulator 515 based on whether the duty cycle error exceeds the threshold 631 or not.

It will be further understood that in some embodiments according to the invention, additional filtering can be selected along with additional levels of threshold values for the duty cycle error. For example, in some embodiments according to the invention, other filtering can be selected if the duty cycle error exceeds a second duty cycle error threshold value. Although particular filtering characteristics are described herein, it will be understood that any different types of filtering or any variability in a digital filter that is programmed for operation as described herein can be utilized along with the appropriate number of corresponding thresholds.

Figure 7:
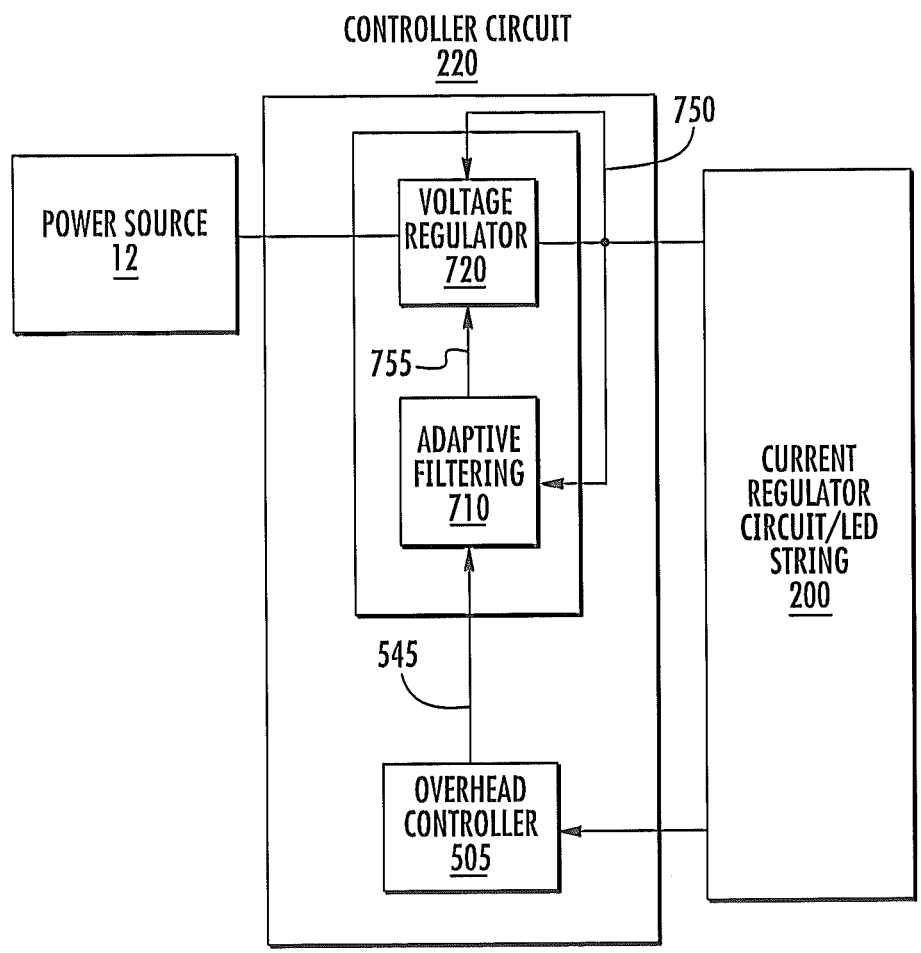
FIG. 7 is a schematic block diagram illustrating the controller circuit including a voltage regulator with adaptive voltage error filtering in some embodiments according to the invention.

FIG. 7 is a schematic block diagram illustrating the controller circuit 220 including a voltage regulator 720 with adaptive filtering of voltage regulator error in some embodiments according to the invention. According to FIG. 7, the controller circuit 220 includes a voltage regulator 720 that receives the voltage regulator commands VCTL 545 and provides a control signal 755 (in the form of the voltage regulator error) to the voltage regulator 720, which drives the voltage regulator output to the current regulator circuit/LED string 200. The voltage regulator output is also fed-back to the voltage regulator 720 in the form of a feedback signal 750. As further shown in FIG. 7, an adaptive filtering function 710 can adapt the filtering of the voltage regulator commands VCTL 545 to provide the control signal 755 (in the form of the error) to the voltage regulator 720.

In operation, the adaptive filtering 710 may change the filtering so that the output 750 can be changed more quickly, when for example, transients occur in the string 200 or in the power source 12, so that better regulation of the output 750 may be achieved. For example, when large transients occur in the string 200, the output 750 may need to be increased more rapidly than during steady operation when, for example, power factor correction may be more of an issue. Therefore, in such embodiments, the adaptive filtering 710 can be utilized to provide fast response to the commands 545 to properly regulate the output 750 in some conditions, whereas other filtering is provided in other conditions (such as during steady-state operation).

Figure 8:
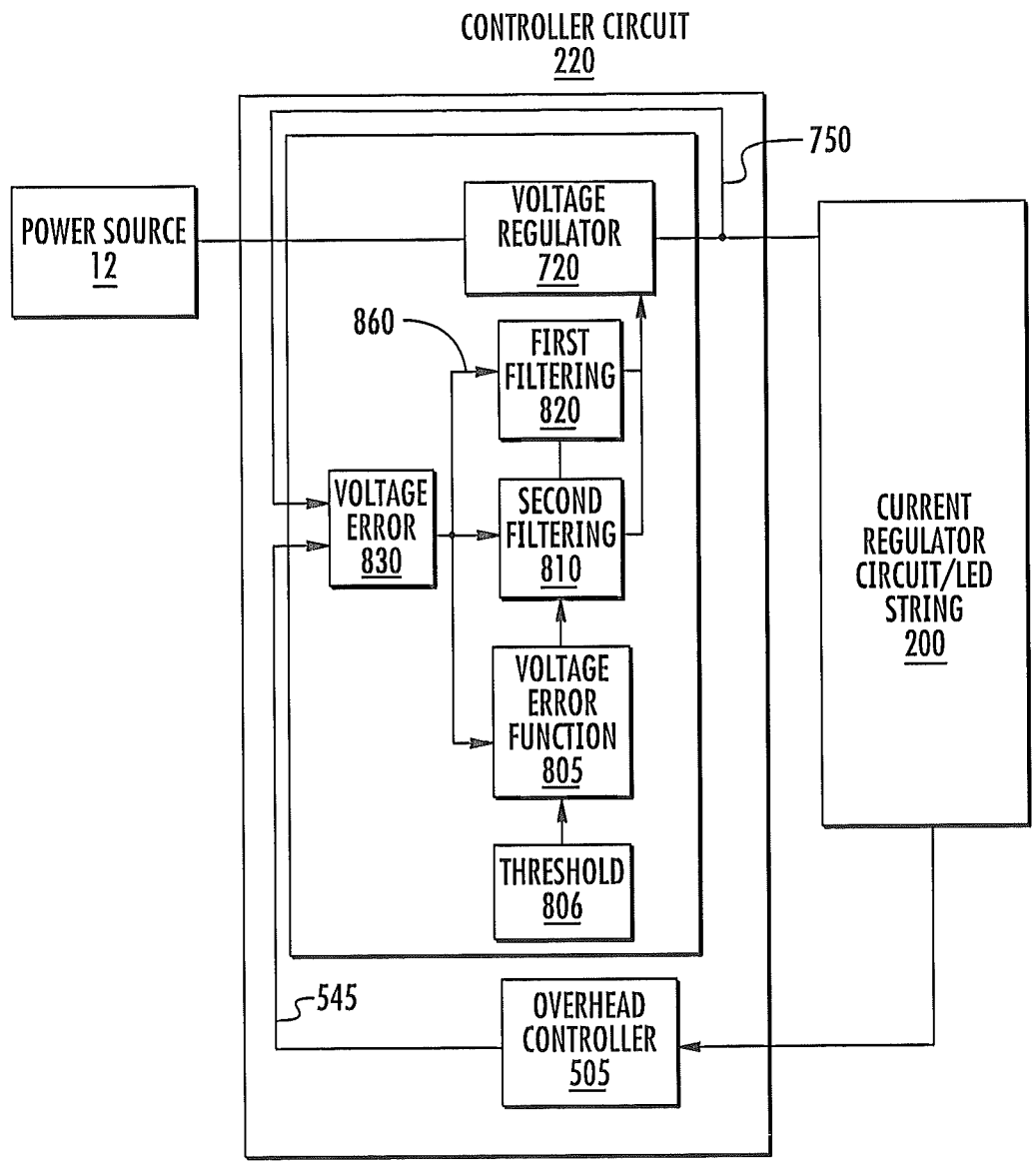
FIG. 8 is a schematic block diagram illustrating the voltage regulator of FIG. 7 with adaptive voltage error filtering in greater detail in some embodiments according to the invention.

FIG. 8 is a schematic block diagram illustrating the voltage regulator 720 of FIG. 7 with adaptive filtering of voltage regulator control signals in greater detail in some embodiments according to the invention. According to FIG. 8, the voltage regulator 720 is coupled to a voltage error function 830 that receives the voltage regulator commands 545 and an indication of the voltage regulator output 750 to determine an error associated with the voltage regulator output 750. For example, in some embodiments, the voltage regulator command 545 may indicate that the output of the voltage regulator should be at a particular level whereas the voltage regulator output 750 may actually be at a different level compared to the particular level indicated by the voltage regulator command 545. Accordingly, the voltage error function 830 can provide a control signal output 860 indicating the error in the voltage regulator output 750 based the comparison to the voltage regulator command 545.

According to FIG. 8, the control signal output 860 can be subject to adaptive filtering based on the level of the error compared to a voltage error threshold 806. In particular, the voltage error function 805 can compare the control signal output 860 to the voltage error threshold 806 to determine how the filtering should be adapted.

In some embodiments according to the invention, the voltage error function 805 can select between first and second filtering 820 and 810 based on whether the voltage error is greater than the voltage error threshold value or not. For example, in some embodiments according to the invention, the voltage error threshold value 806 may be about 5 volts. Therefore, if the error in output 750 exceeds 5 volts, the voltage error function 805 can select first filtering 820 to allow the output 755 to be changed more quickly given that a relatively large error exists in the output voltage 755. If, however, the voltage error function 805 determines that the error is less than the voltage error threshold value 806, the second filtering 810 may be selected which may be more suitable for good power factor correction.

Furthermore, it will be understood that although adaptation between two types of filtering are shown in FIG. 8, more choices of filtering may be implemented. Still further, additional threshold values may be implemented to provide a greater range of adaptive filtering. For example, a second voltage error threshold value may be provided by, which may be used to select third filtering and so on.

Figure 9:
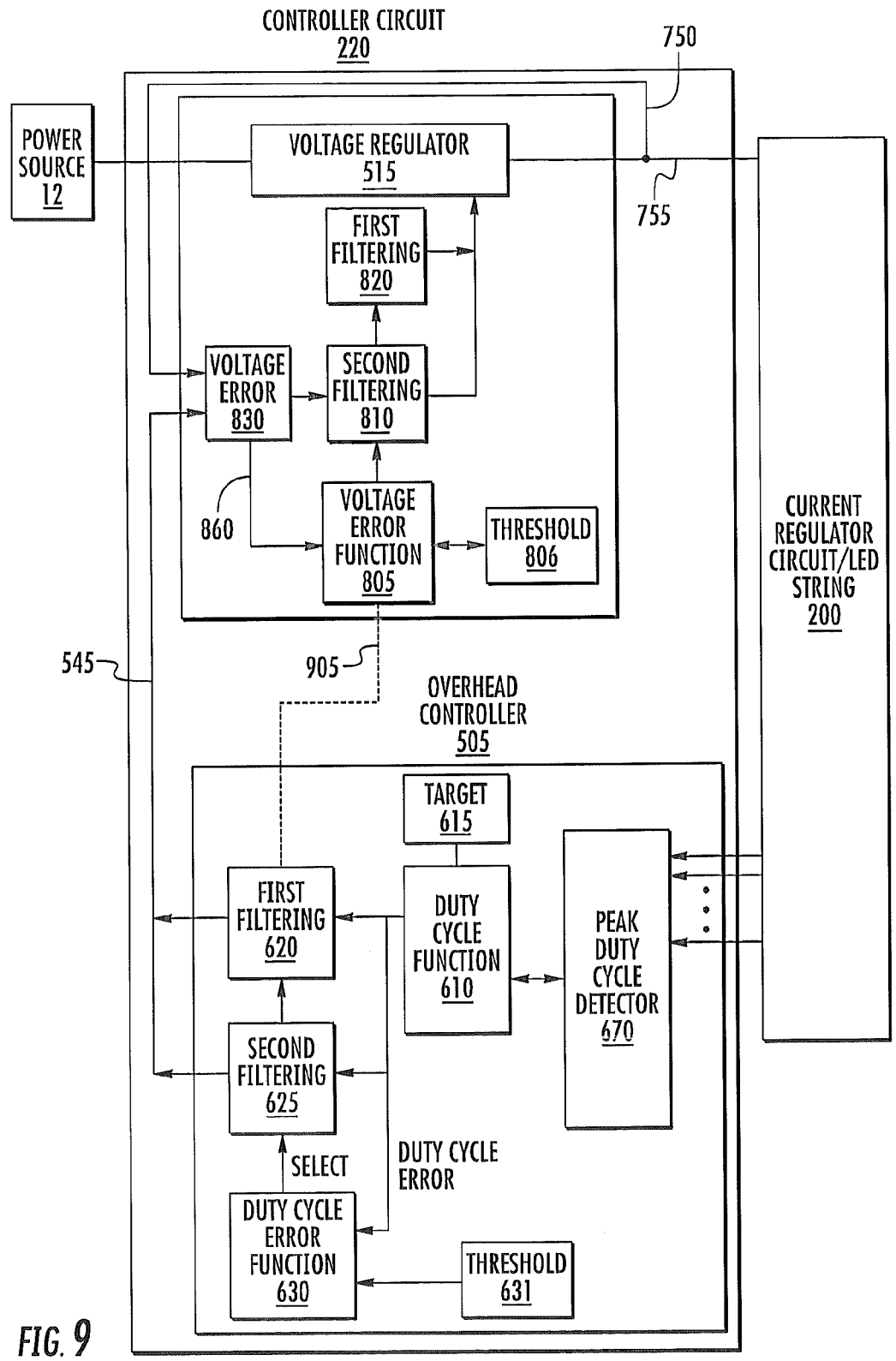
FIG. 9 is a schematic block diagram illustrating the controller circuit including the overhead controller and the voltage regulator both with adaptive filtering of respective error signals in some embodiments according to the invention.

FIG. 9 is a schematic block diagram illustrating the controller circuit 220 including the overhead controller 505 and the voltage regulator 720 both with adaptive filtering for control signals in some embodiments according to the invention. According to FIG. 9, adaptive filtering can be provided on control signals associated with both the voltage regulator 720 (as described above in reference to FIGS. 7 and 8) as well as the overhead controller 505 (as described above in reference to FIGS. 5 and 6).

Still further, as shown in FIG. 9, an additional adaptive selection signal 905 may be provided from the overhead controller 505 to the voltage regulator 720. The additional adaptive selection signal 905 may be provided to both the voltage regulator 720 and the overhead controller 505. For example, in some embodiments according to the invention, the duty cycle error function 630 may provide the additional adaptive selection signal 905 to select among first and second filtering 620 and 625 for the duty cycle error and among first and second filtering 820 and 810 for the voltage regulator error. Accordingly, in some embodiments according to the invention, a single parameter, such as the duty cycle error may be used to adapt the filtering for both the duty cycle error and the voltage regulator error.

As described herein, in some embodiments according to the invention, a lighting apparatus can include a controller circuit that is operatively coupled to current regulator circuits driving respective strings of LEDs using a control signal that can be subjected to different filtering based on whether an error value for the control signal is more or less than a threshold value for the error. The adaptation of the filtering can be provided by comparing the error in the control signal to a threshold value for the error. For example, if the error is less than the threshold value, then relatively low bandwidth linear filtering may be used. If, however, the error in the control signal is greater than the threshold value for the error, relatively high bandwidth linear or nonlinear filtering may be used.

As appreciated by the present inventors, using relatively low bandwidth linear filtering on the control signal may provide for better power factor correction, whereas the higher bandwidth filtering may trade off some power factor correction in favor of more immediate regulation of the voltage provided to the current regulator circuit when, for example, transients occur in the load or in the power source. For example, in some embodiments according to the invention, when the LEDs in the strings switch on/off the voltage provided to the string may vary such that regulation may be lost unless otherwise quickly addressed. Accordingly, the higher bandwidth filtering may be used to enable more feedback of the voltage regulator error to more quickly restore regulation of the voltage provided to the string when transients occur.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the disclosure. As used herein, the term "and/or" includes any and all combinations of one or more of the associated listed items.

The terminology used herein is for the purpose of describing particular embodiments only and is not intended to be limiting of the inventive concepts. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "controller,", "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, assembly language, dynamic programming languages such as Python, Ruby and Groovy, or other programming languages.

Aspects of the present disclosure are described herein with reference to flowchart illustrations and/or block diagrams of methods, apparatus (systems), and computer program products according to embodiments of the disclosure. It will be understood that each block of the diagrams, and combinations of diagrams, can be implemented by computer program instructions. These computer program instructions may be provided to a controller (or processor) of a general purpose computer, special purpose computer, or other programmable data processing apparatus to produce a machine, such that the instructions, which execute via the processor of the computer or other programmable instruction execution apparatus, create a mechanism for implementing the functions/acts specified in the diagram.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

As used herein, the term "controller circuit" includes, but it not limited to, a hardware element operatively coupled with a firmware component and/or software component.

In the drawings and specification, there have been disclosed typical embodiments and, although specific terms are employed, they are used in a generic and descriptive sense only and not for purposes of limitation, the scope of the inventive concepts being set forth in the following claims.

What is claimed:

1. A method of operating a switched mode power supply circuit, the method comprising:
   determining an error in a control signal for a switched mode power supply circuit;
   comparing the error to an error threshold value to provide a filtering selection;
   adapting filtering of the error based on the filtering selection to provide a selected filtering; and
   filtering the error using the selected filtering,
   wherein determining an error in a control signal comprises comparing a present value of the control signal to a target value of the control signal,
   wherein the control signal comprises a duty cycle value of a switching signal provided to the switched mode power supply circuit and the target value comprises a duty cycle target value for the switched mode power supply circuit,
   wherein the error comprises a duty cycle error value and the error threshold comprises a duty cycle error threshold value; and
   wherein comparing comprises comparing the duty cycle error value to the duty cycle error threshold value to provide the filtering selection to an overhead regulator configured to provide operational commands to a voltage regulator.

2. The method of claim 1 wherein the control signal comprises a voltage regulator command configured to control a value of output voltage of the voltage regulator and the target value comprises the value of output voltage of the voltage regulator.

3. The method of claim 1 wherein the duty cycle error threshold value comprises about 5% or less of the duty cycle target value.

4. The method of claim 1 wherein adapting filtering of the error comprises setting a gain for filtering the error based on the filtering selection.

5. The method of claim 1 wherein adapting filtering comprises selecting a first filter responsive to the error being less than the error threshold value.

6. The method of claim 4 wherein filtering the error comprises filtering the error using the gain for the filtering comprising less than a line frequency of a power source coupled to the switched mode power supply circuit.

7. The method of claim 1 wherein adapting filtering of the error comprises selecting a second filter responsive to the error being greater than the error threshold value.

8. The method of claim 7 wherein filtering the error comprises filtering the error using the second selected filter comprising the high bandwidth linear filtering or the high bandwidth non-linear filtering.

9. The method of claim 1 wherein the switched mode power supply circuit comprises a switched current regulator circuit configured to provide regulated current to a plurality of strings of Light Emitting Diodes (LEDs).

10. The method of claim 1 wherein comparing the error to the error threshold value to provide the filtering selection is performed under programmed control within a controller circuit.

11. The method of claim 10 wherein each of the determining, the adapting filtering, and the filtering operations is performed under programmed control within the controller circuit.

12. A method of operating a switched mode power supply circuit, the method comprising:
   determining an error in a control signal for a switched mode power supply circuit;
   comparing the error to an error threshold value to provide a filtering selection;
   adapting filtering of the error based on the filtering selection to provide a selected filtering; and
   filtering the error using the selected filtering,
   wherein determining an error in a control signal comprises comparing a present value of the control signal to a target value of the control signal
   wherein the control signal comprises a voltage regulator command configured to control a value of output voltage of the voltage regulator and the target value comprises the value of output voltage of the voltage regulator
   wherein the error comprises a voltage regulator output error value and the error threshold comprises a voltage regulator output error threshold value; and
   wherein comparing comprises comparing the voltage regulator output error value to the voltage regulator output error threshold value to provide the filtering selection.

13. A power supply circuit, comprising:
   a voltage regulator configured to receive an input voltage and to generate an output voltage;
   a switching current regulator circuit coupled to the output voltage of the voltage regulator and configured to regulate a level of current supplied to a load, wherein the switching current regulator circuit is controlled by a switching signal having a duty cycle; and
   a controller circuit that is configured to compare a voltage regulator error in a voltage regulator output to a voltage regulator error threshold value to adapt filtering used to filter the voltage regulator error used to control the voltage regulator output, wherein the controller circuit is configured to provide a first gain setting for the filtering of the voltage regulator error being less than the voltage regulator error threshold value.

14. The power supply circuit of claim 13 wherein the voltage regulator error threshold value comprises about 5 volts or less.

15. The power supply circuit of claim 13 wherein the gain setting for the filtering comprises linear low bandwidth filtering configured to provide a power factor correction of greater than about 0.90.

16. The power supply circuit of claim 13 wherein the load comprises a plurality of strings of Light Emitting Diodes.

17. The power supply circuit of claim 13, wherein the switching current regulator circuit comprises:
   a switch having a control terminal that is configured to receive the switching signal;
   a diode coupled between the switch and the output of the voltage regulator;
   an inductor coupled between the switch and the load; and
   a current sensing resistor coupled between the switch and a ground terminal.

18. The power supply circuit of claim 13 wherein the controller circuit comprises a voltage regulator configured to adapt the filtering by setting a gain for filtering the voltage regulator error.

19. The power supply circuit of claim 13 wherein the controller circuit further comprises an overhead controller configured to compare a peak duty cycle error in to a duty cycle error threshold value to adapt filtering used to filter the peak duty cycle error fed-back to the voltage regulator.

20. The power supply circuit of claim 19 wherein the peak duty cycle error fed-back to the voltage regulator is provided as voltage regulator commands used to determine the voltage regulator error.

21. The power supply circuit of claim 19 wherein the duty cycle error threshold value comprises about 5% or less of the duty cycle.

22. The power supply circuit of claim 19 wherein the overhead controller is configured to provide a gain setting for the filtering of the duty cycle error based the comparison to the duty cycle error threshold value.

23. The power supply circuit of claim 13 wherein the first gain setting comprises low bandwidth linear filtering configured to provide a power factor correction greater than about 0.90.

24. The power supply circuit of claim 19 wherein the overhead controller is configured to select a second gain setting for the filtering responsive to the duty cycle error being greater than the duty cycle error threshold value.

25. The power supply circuit of claim 24 wherein the second gain setting comprises high bandwidth non-linear filtering.

26. A power supply circuit, comprising:
   a voltage regulator configured to receive an input voltage and to generate an output voltage;
   a switching current regulator circuit coupled to the output voltage of the voltage regulator and configured to regulate a level of current supplied to a load, wherein the switching current regulator circuit is controlled by a switching signal having a duty cycle; and
   a controller circuit that is configured to compare a voltage regulator error in a voltage regulator output to a voltage regulator error threshold value to adapt filtering used to filter the voltage regulator error used to control the voltage regulator output, wherein the controller circuit is configured to provide a second gain setting for the filtering of the voltage regulator error being greater than the voltage regulator error threshold value.

27. The power supply circuit of claim 26 wherein the filtering comprises high bandwidth non-linear filtering.

* * * * *